United States Patent
Stählin

(10) Patent No.: US 9,377,317 B2
(45) Date of Patent: Jun. 28, 2016

(54) METHOD AND DEVICE FOR DETERMINING A HEIGHT OF A FLUID LEVEL IN A FLUID CONTAINER

(71) Applicant: Ulrich Stählin, Eschborn (DE)

(72) Inventor: Ulrich Stählin, Eschborn (DE)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 14/415,446

(22) PCT Filed: Jun. 28, 2013

(86) PCT No.: PCT/EP2013/063625
§ 371 (c)(1),
(2) Date: Jan. 16, 2015

(87) PCT Pub. No.: WO2014/012768
PCT Pub. Date: Jan. 23, 2014

(65) Prior Publication Data
US 2015/0204683 A1  Jul. 23, 2015

(30) Foreign Application Priority Data

Jul. 19, 2012  (DE) .......... 10 2012 212 671

(51) Int. Cl.
*G01C 21/00* (2006.01)
*G01C 21/34* (2006.01)
*G01C 21/36* (2006.01)

(52) U.S. Cl.
CPC ........ *G01C 21/3415* (2013.01); *G01C 21/3602* (2013.01); *G01C 21/3676* (2013.01)

(58) Field of Classification Search
USPC .......................................... 701/411
See application file for complete search history.

(56) References Cited

U.S. PATENT DOCUMENTS

| | | | | |
|---|---|---|---|---|
| 5,925,090 A | * | 7/1999 | Poonsaengsathit | G01C 21/3626 340/990 |
| 6,148,090 A | * | 11/2000 | Narioka | G09B 29/106 382/113 |
| 6,535,814 B2 | | 3/2003 | Huertgen et al. | |
| 2006/0184323 A1 | * | 8/2006 | Park | G01C 21/36 701/431 |
| 2010/0235079 A1 | * | 9/2010 | Takashima | G01C 21/3461 701/532 |
| 2011/0082640 A1 | * | 4/2011 | Bohme | G01C 21/3602 701/533 |
| 2013/0173159 A1 | * | 7/2013 | Trum | G01C 21/3617 701/533 |
| 2015/0142314 A1 | * | 5/2015 | Lemay | G01C 21/3667 701/533 |

FOREIGN PATENT DOCUMENTS

| | | |
|---|---|---|
| DE | 100 12 471 A1 | 9/2001 |
| DE | 10 2009 043 764 A1 | 4/2011 |
| EP | 1 626 250 A1 | 2/2006 |
| JP | 2011 102732 | 5/2011 |
| WO | WO 2012/034581 A1 | 3/2012 |

* cited by examiner

*Primary Examiner* — Hussein A. Elchanti
(74) *Attorney, Agent, or Firm* — Cozen O'Connor

(57) ABSTRACT

A method for guiding a vehicle driver along a travel route includes: ascertaining the travel route; identifying a traffic sign which is arranged along the travel route and which displays directions indicating an alternate route, the directions deviating from a recommended route according to the travel route; outputting the recommended route upon or prior to reaching the traffic sign; and outputting information relating to the deviation between the directions and the recommended route.

10 Claims, 3 Drawing Sheets

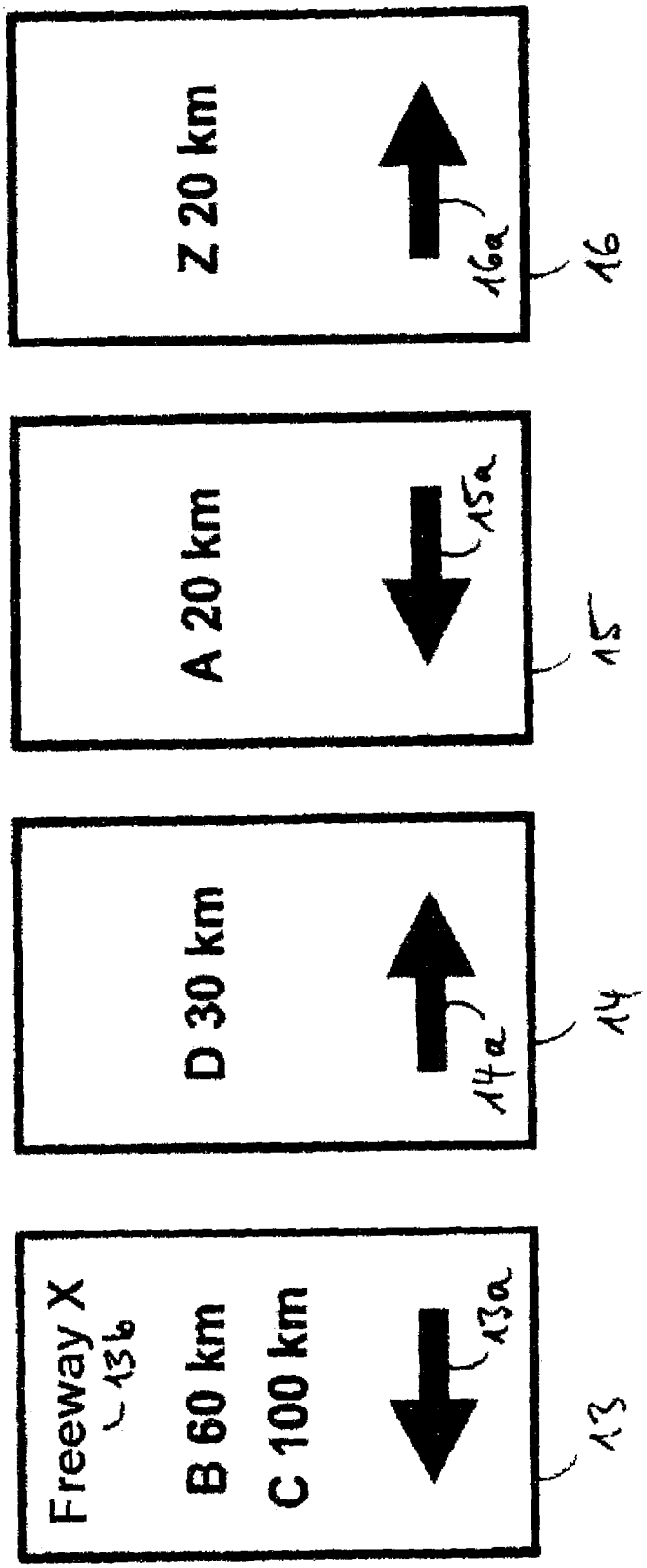

US 9,377,317 B2

METHOD AND DEVICE FOR DETERMINING A HEIGHT OF A FLUID LEVEL IN A FLUID CONTAINER

CROSS-REFERENCE TO RELATED APPLICATIONS

This is a U.S. national stage of application No. PCT/EP2013/063625, filed on 28 Jun. 2013, which claims priority to the German Application No. DE 10 2012 212 671.6 filed 19 Jul. 2012, the content of both incorporated herein by reference.

BACKGROUND OF THE INVENTION

1. Field of the Invention

The present invention relates to a method for guiding a vehicle driver along a travel route and a navigation device for carrying out the method.

2. Related Art

Navigation devices, in particular for passenger cars or for trucks, have been known for a long time. They are configured to read in a destination input by a user, for example a vehicle driver, and to determine a current position of the navigation device, or a current position of the vehicle in which the navigation device is located. They are also configured to calculate, on the basis of the destination and the current position, a travel route that connects the current position to the destination. As soon as the travel route is calculated, the navigation device guides the user along the calculated travel route by outputting corresponding recommended routes via an output unit. The outputting can take place graphically, for example via a screen, and/or acoustically, for example via a loudspeaker.

Known navigation devices also provide the user with the possibility of calculating the travel route as a function of optimization parameters which the user can input before the travel route is calculated. In this way, the user can, for example, predefine that a route length or expected travel duration along the travel route to be calculated is to be as short as possible. Likewise, the user can predefine that energy consumption of the vehicle along the travel route or a road toll to be paid along the travel route is to be minimized. This can lead to a situation in which the calculated travel route is not the fastest or the shortest connection between the current position of the vehicle and the destination, the connection leading, for example, via a freeway or via a country road.

On the journey along the travel route, the vehicle driver may, therefore, come across a road sign which contains directions indicating an alternative route, wherein the alternative route is different from the previously calculated travel route. If the vehicle driver, for example, input a town A as the destination and if he comes across, at a fork in the road on the route, a road sign which points to the left and which contains an indication of a freeway to A, he experiences uncertainly if the navigation device outputs a recommended route that instructs him to turn off to the right, that is to say in the opposite direction of the sign. This can lead to a situation in which the driver's uncertainty causes him to deviate from the calculated travel route.

SUMMARY OF THE INVENTION

An object of the present invention is to propose a method for guiding a vehicle driver along a travel route, which method prepares data relating to the travel route and makes it accessible to the vehicle driver such that the driver can make a decision about a route to be selected for continued travel as far as possible at any time and, in this context, in each case with the greatest possible certainty. In addition, a navigation device is proposed with which such a method can be carried out.

Therefore, a method for guiding a vehicle driver along a travel route is proposed which comprises the following steps:
determining the travel route,
identifying a road sign arranged along the travel route and displays directions indicating an alternative route, wherein the displayed directions deviate from a recommended route according to the travel route,
outputting the recommended route on, or prior to, reaching the road sign, and
outputting information relating to the deviation between the displayed directions and the recommended route.

As a result of: the fact that a road sign is identified, which is arranged along the travel route, and which displays directions indicating an alternative route, wherein the directions deviate from a recommended route according to the travel route; the fact that the recommended route is output on, or prior to, reaching the road sign; and the fact that information that relates to the deviation between the directions and the recommended route is output, specifically preferably directly before or directly after the outputting of the recommended route, the vehicle driver can make a decision as to which route he would like to continue to travel on, at any time and with the greatest possible certainty. The method is typically carried out by a navigation device or driver assistance system arranged in a vehicle, for example a passenger car or a truck.

It is to be noted that according to the method proposed here, preferably only road signs arranged at or before a fork in the road at which it is actually possible to follow the recommended route according to the travel route are identified. This normally includes, in particular, the instance in which the displayed directions actually indicate an alternative route and not, for example, a single possible route. The identification of the road sign can therefore comprise selecting the road sign from a multiplicity of road signs arranged along the travel route. The information usually comprises an explanation as to why the recommended route deviates from the directions according to the travel route. This avoids giving the vehicle driver the impression that the deviation is due to a fault in a navigation device used to carry out the method.

Typically, the determination of the travel route comprises inputting a destination, wherein the destination is an end point of the travel route to be determined or to be calculated, and that a current location of the vehicle is determined. The travel route is then determined on the basis of the destination and on the basis of the current location. It can be provided that a new travel route is calculated as soon as the driver deviates from the previously calculated travel route. In this case, the newly calculated travel route takes the place of the previously calculated travel route. The destination can be an address or a component of an address, a name of a locality, geographic coordinates or a designation by which a geographic position is determined, for example the name of a building. The travel route connects the current location of the vehicle to the destination and typically comprises designations and geographic coordinates of roads which lead from the current location to the destination.

A specific embodiment is defined in that the determination of the travel route comprises optimization of one or more of the following parameters which relate to the travel route: an expected travel duration along the travel route, a length of the travel route, expected energy consumption of the vehicle on a journey along the travel route, a road toll to be paid when following the travel route, a maximum positive gradient along the travel route, a maximum negative gradient along the travel route, a maximum distance between refueling points and/or battery charging stations located along the travel route, a view of a natural or man-made site, a minimum height of a flyover over a road being used when following the travel route. The travel route is therefore calculated in such a way that values of the specified parameters relating to a journey along the travel route to be calculated are respectively maximized or minimized. The specified parameters can be input, for example, by the vehicle driver via an input and output unit of the navigation device. The vehicle driver, or another user of the navigation device, has the possibility of adapting the travel route to be calculated to his personal preferences and/or the technical conditions of his vehicle.

It may additionally be provided that the information contains an indication as to which of the specified parameters or values thereof is/are changed when the vehicle follows the recommended route, and/or that the information contains an indication as to which of the specified parameters is/are changed when the vehicle follows the directions. The information can, in particular, contain an indication as to which of the specified parameters or values thereof is/are increased, decreased, improved or worsened when the vehicle follows the recommended route or the directions. The information can also contain an indication as to how many of the corresponding parameters have been respectively changed. It is also respectively possible to specify absolute values of the parameters. In one specific embodiment, the information can include, for example, the fact that in order to arrive at the destination a first quantity of fuel is required if the driver follows the directions indicating the alternative route, and that to arrive at the destination a second quantity of fuel is required if the driver follows the recommended route according to the travel route. The driver is therefore provided with additional criteria on the basis of which he can decide whether he wishes to follow the directions or the recommended route.

A further embodiment is defined in that the directions indicating the alternative route comprise
a) a name or a designation of a destination, wherein the destination is an end point of the travel route, and/or comprise
b) a name or a designation of a first locality, wherein a distance of the first locality from the destination is shorter than a predefined maximum distance, and/or comprise
c) a name or a designation of a second locality, wherein the second locality is located on the travel route, and/or comprise
d) a name or a designation of a third locality, wherein the third locality is located on a first route which is the fastest and/or shortest connection between a location of the respective road sign and the destination and/or comprise
e) a name or a designation of a fourth locality, wherein an initial section of a second route, which is the fastest and/or shortest connection between the location of the respective road sign and the fourth locality, and an initial section of the first route coincide.

In other words, only road signs along the travel route that relate to the calculated travel route or the destination are therefore identified, and only road signs along the travel route that relate to the calculated travel route or the destination are indicated to the driver by the outputting of the recommended route and by the outputting of the information. Only such directions are suitable for bringing about uncertainty on the part of the driver as to which of various possible routes he should travel along at the respective road sign. The predefined maximum distance of the first locality from the destination can be more than 5 km, more than 10 km or more than 20 km. Alternatively or additionally the predefined, maximum distance can be less than 50 km, less than 30 km or less than 20 km. The predefined maximum distance of the first locality can also be selected as a function of a distance of the current location of the vehicle from the destination. The predefined maximum distance can decrease, for example, as the vehicle or the navigation device approaches the destination. The fact that the second locality is on the travel route should preferably include the fact that a shortest distance between the second locality and the travel route is less than 20 km, less than 10 km or less than 5 km. The fact that the third locality is located on the first route is preferably intended to include the fact that a shortest distance between the third locality and the first route is less than 20 km, less than 10 km or less than 5 km. The initial section of the first route and the initial section of the second route each start at the location of the respective road sign.

It can be provided that before carrying out the method a user can select which of the criteria specified under the letters a) to e) should be used during the identification process. It is therefore possible for the user to predefine, for example, that only road signs which indicate the name or the designation of the destination itself are to be taken into account. It is possible to provide that the user can determine that one or more of the criteria specified under the letters a) to e) are to be taken into account in the identification of the road sign.

A further specific embodiment provides that the identification of the road sign comprises calling data, which relate to road signs arranged along the travel route, from a memory unit of a navigation device arranged in the vehicle, and/or transmitting that data via a radio link to the navigation device, and/or acquiring that data during the travel of the vehicle by means of an optical image capturing unit arranged in the vehicle, wherein the data contain locations of the road signs and directions displayed by the road signs.

The road signs specified here are therefore usually road signs that respectively contain directions indicating an alternative route and that deviate from a respective recommended route according to the travel route, along with road signs which do not contain such directions. According to this embodiment, road signs arranged as such along the travel route and, which do not relate to the travel route and/or the destination, are therefore eliminated, and as a result of this there can be no doubt about the route to be traveled along on the part of the vehicle driver. The identification process can therefore comprise selecting that road sign or those road signs that respectively comprise directions indicating alternative travel routes. The road sign or road signs that comprise directions indicating the alternative travel route is or are then selected from a multiplicity of road signs arranged along the travel route.

The statement that the directions indicating the alternative route deviate from the recommended route according to the travel route can include the fact that the directions indicating the alternative route comprise an indication of a first direction to be traveled in, or that the directions indicating the alternative route comprise a first designation of a first road to be followed, and that the recommended route comprises an indication of a second direction to be traveled in, or that the recommended route comprises a second designation of a second road to be followed, wherein the first direction is different from the second direction, and/or wherein the first designation is different from the second designation.

The indication of the first direction to be traveled in can be given, for example, in the form of an arrow displayed on the road sign. However, it can, for example, also be the road sign itself, which is in the shape of an arrow. The indication of the second direction to be traveled in can also be an arrow displayed, for example, on an output screen of the navigation device. The indication of the second direction to be traveled in can also be given in the form of an acoustic announcement such as, for example "please turn left" or the like, which is output via an acoustic output unit of the navigation device. In other words, it can be provided that the recommended route and/or the information are/is output graphically and/or acoustically. For example, a graphic output can be carried out via an output screen of the navigation device. An acoustic output can be output, for example, via a loudspeaker.

So that the vehicle driver is alerted in good time to the road sign before the road sign is reached, it can be provided that the recommended route and/or the information are/is output as soon as the vehicle undershoots a predefined distance from the road sign and/or as soon as an expected time period up to arrival at the road sign is less than a predefined time period. The predefined distance from the road sign can be, for example, at least 100 m or at least 200 m. Alternatively or additionally, the predefined distance from the road sign can be less than 500 m or less than 400 m. The predefined distance and/or the predefined time period can respectively be selected as a function of a current speed of the vehicle. The predefined time period can be at least 10 seconds or at least 20 seconds. Alternatively or additionally, the predefined time period can be less than 60 seconds or less than 30 seconds.

In addition, a navigation device is proposed, in particular for a motor vehicle, comprising a memory and a computing unit for determining a travel route and for identifying a road sign arranged along the determined travel route and which displays directions indicating an alternative travel route, wherein the directions deviate from a recommended route according to the determined travel route, and comprising an output unit for outputting the recommended route and for outputting information relating to the deviation between the directions and the recommended route.

The navigation device also usually comprises an input unit for inputting the destination and a positioning unit for determining a current position of the navigation device. The input unit and the output unit can be combined, for example, in a sensor screen, also referred to as a touch screen.

The output unit can also comprise a loudspeaker for an acoustic output. The memory unit and computing unit can comprise, for example, a microprocessor and a memory chip. The navigation device can have a data interface via which the data relating to the road signs arranged along the travel route can be transmitted to the navigation device. For example, data from a digital data carrier, such as for example a USB plug or a DVD, can be transmitted to the navigation device via the data interface. For wireless transmission of data, the navigation device can also have a transceiver unit. For acquiring the data relating to the road signs arranged along the travel route, the navigation device can also comprise an optical image-capturing unit, for example a camera.

BRIEF DESCRIPTION OF THE DRAWINGS

An exemplary embodiment of the proposed method and of the proposed navigation device is illustrated in the drawings and explained in more detail on the basis of the following description. In the drawings:

FIG. 3 shows a view of a detail of the road signs arranged at the forks in the road shown in FIG. 2.

DETAILED DESCRIPTION OF THE PRESENTLY PREFERRED EMBODIMENTS

Figure 1:
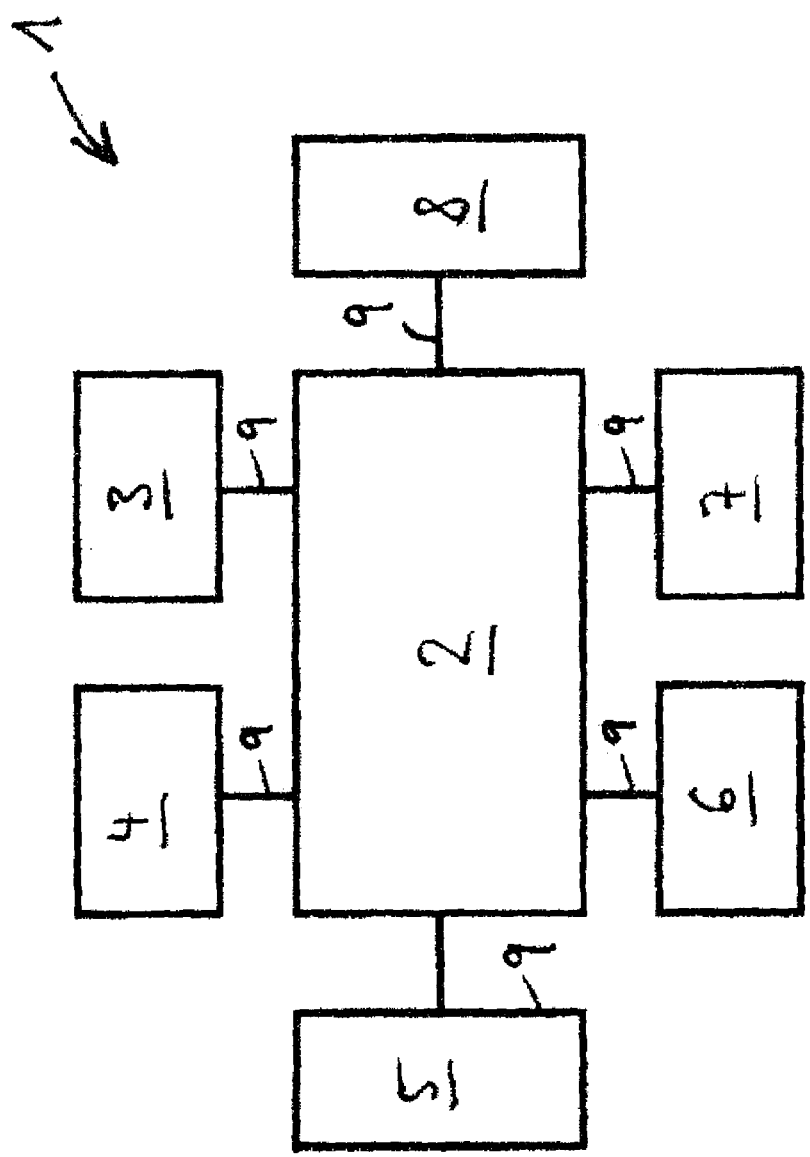
FIG. 1 shows a navigation device in a schematic illustration.

FIG. 1 is a schematic view of a navigation device 1 having a microprocessor 2, a memory chip 3, a data interface 4, a camera 5, a transceiver unit 6, a sensor screen 7 and having a loudspeaker 8. The specified components are each connected via data lines 9 to the microprocessor 2. In the example described above, the navigation device 1 is arranged in a passenger car.

Figure 2:
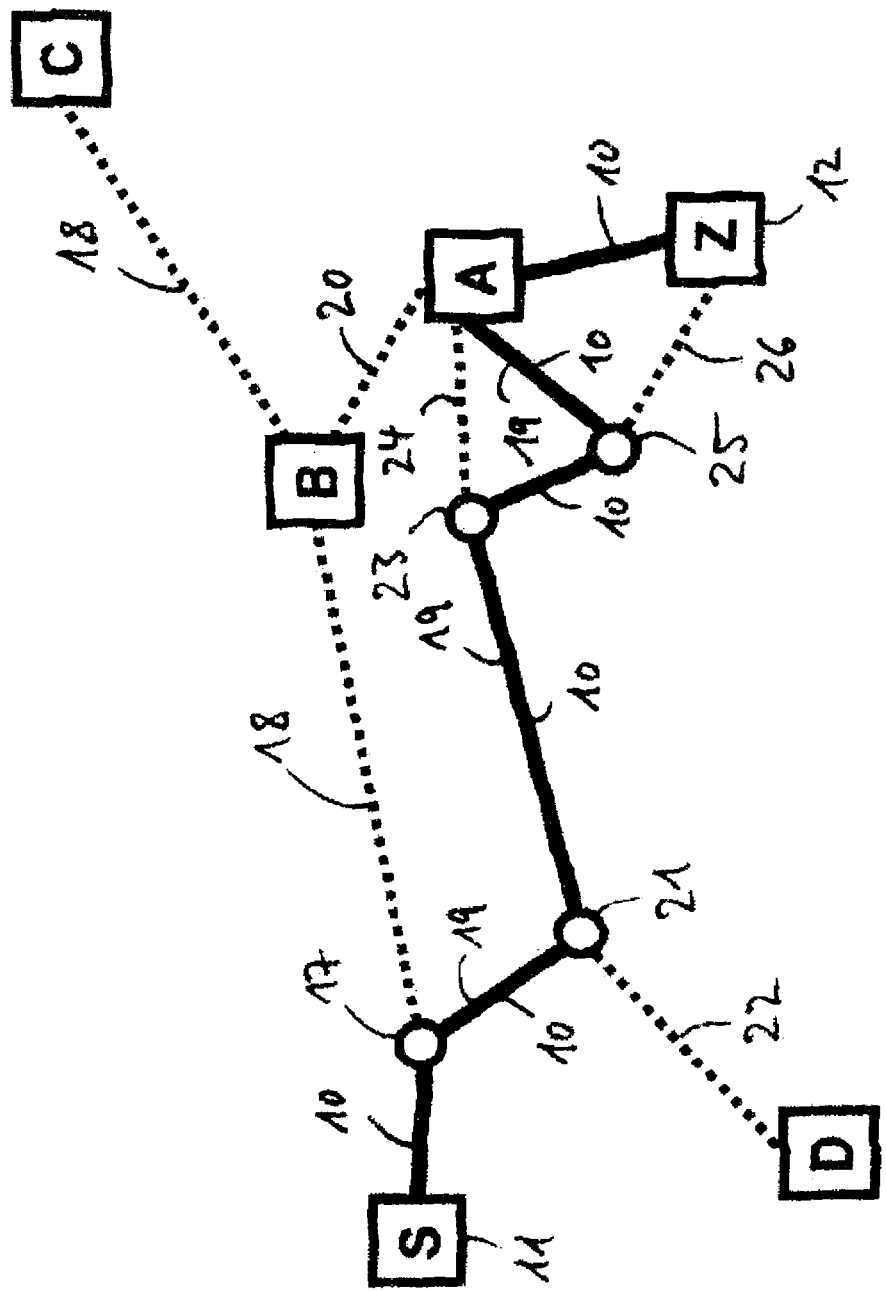
FIG. 2 is a schematic view of a travel route connecting a starting point and a destination, forks in the road along the travel route at which in each case a road sign is arranged, and of alternative routes.

In the text which follows, a method for guiding a vehicle driver along a travel route is described. The vehicle driver is driving the passenger car in which the navigation device 1 is arranged. In the text which follows, the vehicle driver is also referred to as the driver. In a first step of the method, a travel route 10, which is illustrated in FIG. 2 as a continuous line, is calculated by the navigation device 1. For this purpose, the driver, who is located with the passenger car at a starting point 11, denoted by "S", of the travel route 10 to be calculated, enters a destination 12, denoted by "Z", by the sensor screen 7 of the navigation device 1. The destination 12 can comprise, for example, an address or geographic coordinates. In addition, the driver enters parameters via the sensor screen 7, which parameters are to be optimized with the travel route 10, which is to be calculated and which is intended to connect the starting point 11 to the destination 12. A number of these parameters can be displayed to the driver, for example in a selection menu on the sensor screen 7.

In the present example, the driver enters that the travel route 10 to be calculated should, as far as possible, not lead via a freeway. Since the driver's passenger car is an electric vehicle with limited engine performance, the driver also enters that a maximum positive gradient along the travel route 10 to be calculated should be at most 5%. Finally, the driver enters that the travel route 10 to be calculated should lead past a famous cathedral in the town A, which is located in the vicinity of the destination 12. The microprocessor 2 of the navigation device 1 subsequently calculates, on the basis of the coordinates of the starting point 11 at which the passenger car is located with the driver and the navigation device 1 at this moment, on the basis of the coordinates of the destination 12 and by taking into account the parameters just entered, the travel route 10, which connects the starting point 11 to the destination 12. In order to calculate the travel route 10, the microprocessor 2 references a digital map stored in the memory chip 3. On a standard basis, the microprocessor 2 calculates the travel route 10 such that unexpected travel time along the travel route 10, taking into account the parameters input by the driver, is minimized.

Further parameters, which are not described explicitly here and which can be entered by the driver and optimized in respect of a travel route to be calculated, comprise, for example, a route length, an expected energy consumption of the vehicle along the travel route, a road toll to be paid along the travel route, a maximum negative gradient, a maximum distance between refueling points and/or battery charging stations for an electrically operated vehicle located along the travel route, a minimum height of a flyover over a road used when following the travel route or a view of a natural or man-made sight. By virtue of the fact that the driver has the possibility of entering such optimization parameters, he can calculate the travel route according to his individual wishes or taking into account technical conditions of his vehicle.

In FIG. 2, locations of road signs 13 to 16 arranged along the travel route 10 (see FIG. 3) are highlighted as circles. In the present case, data which relate to the road signs 13 to 16 are contained in the digital map stored in the memory chip 3. These data comprise the locations of the road signs 13 to 16 and directions respectively displayed by the road signs 13 to 16. In alternative embodiments of the method described here, the data relating to the road signs 13 to 16 can also be transmitted to the navigation device 1 via a radio link, for example via the transceiver unit 6 of the navigation device 1. It is likewise conceivable that the data are captured by the camera 5 arranged in the vehicle when the vehicle approaches the respective road sign.

A view of a detail of the road signs 13 to 16 and directions respectively displayed by them are illustrated in FIG. 3. These road signs 13 to 16, corresponding to forks 17, 21, 23 and 25, respectively are intended to be all the road signs that are arranged along the travel route 10 and visible to the driver on his way from the starting point 11 to the destination 12 along the travel route 10. If the driver then begins his journey at the starting point 11 and follows the travel route 10, after some time he reaches the first road sign 13, which is arranged at a first fork 17 in the road. At the first fork 17 in the road, the driver can either turn to the left and follow the freeway 18, which leads to the towns B and C which are located on the freeway 18, or can turn to the right onto the country road 19 and therefore follow the travel route 10 calculated previously. In particular, the towns A and D can be reached via the country road 19. Correspondingly, the first road sign 13, which is arranged at the first fork 17 in the road has an arrow 13*a* which points to the left and by which a designation 13*b* denoting the freeway 18 ("freeway X" in FIG. 3) and the names of the towns B and C are respectively specified with distance information.

The fastest and shortest connection from the first fork 17 in the road to the destination 12 leads via the freeway 18 and via a further freeway 20, which connects the towns B and A. The first road sign 13 therefore contains the name of the town B, which is located on a route that is the fastest and shortest connection between the location of the first road sign 13 and the destination 12. This is well known to the driver, for example because the freeways 18 and 20 are each well known transportation axes or because the driver has already often selected this route in order to arrive at the destination 12 from the starting point 11. The first road sign 13 consequently contains directions indicating an alternative route the driver could select in order to arrive at the destination 12 from the starting point of the first road sign 13. In the case of the first road sign 13, such traffic directions indicating an alternative route would also be present even if only the large city C were specified on the first road sign 13. The driver in fact knows that he must follow the freeway 18 for a certain time from the first fork 17 in the road to C, specifically as far as the town B, in order to arrive as quickly as possible from the first fork 17 in the road to the destination 12. In other words, an initial section of the shortest connection between the first fork 17 in the road and the town C and an initial section of the shortest connection between the first fork 17 in the road and the destination 12 coincide.

The directions displayed by the first road sign 13, the directions comprising the designation 13*b*, the names of the towns B and C, and the arrow 13*a* pointing to the left, therefore differ from the recommended route according to the travel route 10, according to which, on, or prior to, reaching the first road sign 13, the driver is instructed to turn to the right at the first fork 17 in the road and follow the country road 19. This recommended route is output, for example, graphically via the sensor screen 7 or acoustically via the loudspeaker 8. The microprocessor 2 then evaluates the directions displayed by the first road sign 13 and identifies the first road sign 13 as a road sign which displays directions indicating an alternative route and deviating from a recommended route according to the previously calculated travel route 10, which recommended route was output on, or immediately prior to, the first road sign 13 being reached.

In order to avoid the driver being uncertain when viewing the first road sign 13 as to whether he should turn to the left or to the right at the first fork 17 in the road, information is output via the sensor screen 7 and/or via the loudspeaker 8 explaining to the driver why the recommended route according to the travel route 10 at the first fork 17 in the road (turn right) deviates from the directions displayed by the first road sign 13 (turn left). So that the driver has sufficient time to decide whether he wishes to follow the recommended route according to the travel route 10 or the directions displayed by the first road sign 13, both the recommended route and the information are output as soon as a distance between the passenger car and the first road sign 13 is shorter than a predefined distance, which can be, for example, 300 m. It is likewise conceivable that the microprocessor 2 calculates, as a function of a current speed of the passenger car, a time at which the passenger car is expected to arrive at the road sign 13. The recommended route and/or the information can then be output, for example, 30 seconds before this time.

The specified information can, in particular, contain an indication as to which values the previously specified optimization parameters respectively assume when the vehicle follows the recommended route according to the travel route 10, and which values the optimization parameters respectively assume when the driver follows the directions displayed by the first road sign 13. At the first fork 17 in the road, it will be possible, for example, for the following text to be output via the sensor screen 7 or via the loudspeaker 8: "turn left: freeway, expected travel duration 1 hour; turn right: country road, expected travel duration 1 hour 30 minutes; the route via the country road is preferred since it provides a beautiful panorama of the surroundings." It is also conceivable that the driver has predefined that the fastest travel route is to be calculated, which in this case would lead via the freeway 18. If a traffic jam has formed on the freeway 18 and the route via the freeway 18 would therefore exceptionally take longer than the route via the country road 19, the following message could be output: "because of a traffic jam on the freeway to B, the route via the country road is preferred".

In the present example, the driver decides to follow the travel route 10 and to turn right onto the country road 19. After some time he reaches the second fork 21 in the road at which the second road sign 14 is arranged. On, or prior to, reaching the second fork 21 in the road a recommended route according to the travel route 10 is output via the sensor screen 7 or via the loudspeaker 8, which instructs the driver to turn left at the second fork 21 in the road. The second road sign 14 at the second fork 21 in the road comprises an arrow 14*a* which points to the right and a name of the town D together with distance information. However, since the town D or a further country road 22 leading to the town D does not relate at all to the travel route 10 or to the destination 12, the second road sign 14 is not identified as a road sign which displays directions which indicate an alternative route which leads from the second fork 21 in the road to the destination 12. Information which explains to the driver why he should turn left at the second fork 21 in the road is therefore not output.

The driver continues to follow the travel route 10 and reaches a third fork 23 in the road at which the third road sign 15 is arranged. At the third fork 23 in the road, the driver can turn left onto a road 24 which leads via a hill to the town A or he can turn right and continue to follow the travel route 10. The third road sign 15 displays directions which comprise an arrow 15a pointing to the left, the name of the town A and distance information. The third road sign 15 therefore displays the name of a locality located on the travel route 10. The distance of the town A from the destination 12 is also shorter than a predefined maximum distance of, for example, 20 km. The third road sign 15 is therefore identified by the microprocessor 2 as a road sign which displays directions which indicate an alternative route connecting the third fork 23 in the road to the destination 12. In addition, the arrow 15a on the road sign 15 points to the left, while a recommended route according to the travel route 10 instructs the driver to turn right at the third fork 23 in the road. The directions displayed by the third road sign 15 therefore deviate from the recommended route according to the travel route 10 at the third fork 23 in the road.

The deviation therefore arises as a result of a maximum positive gradient along the road 24 being 10%. Along the travel route 10, the maximum positive gradient is, on the other hand, at most 5%. Directly after the outputting of the recommended route according to the travel route 10 "turn right", information is therefore output again which explains to the driver why the recommended route according to the travel route 10 deviates from the directions on the third road sign 15 at this point. For example, this information contains the following text here, which is output in turn via the sensor screen 7 or via the loudspeaker 8: "turn left: travel duration 30 minutes, maximum positive gradient 10%; turn right: travel duration 30 minutes, maximum positive gradient 5%". Alternatively or additionally, the following message could be output: "we suggest you turn right since the positive gradient on this road is less", or the like.

The driver continues to follow the travel route 10 and reaches a fourth fork 25 in the road. Here, according to the travel route 10 the driver can turn left and continue to follow the country road 19 to the town A with the cathedral. At the fourth fork 25 in the road, there is also, however, the possibility of turning right and arriving at the destination 12 directly via a road 26. The fourth road sign 16 arranged at the fourth fork 25 in the road displays directions comprising an arrow 16a pointing to the right and the name of the locality at which the destination 12 is located. The microprocessor 2 therefore identifies the fourth road sign 16 as a road sign that displays directions indicating an alternative route leading from the fourth fork 25 in the road to the destination 12 and deviating from the recommended route according to the travel route 10 (turn left). As soon as the passenger car has come to 300 m away from the fourth road sign 16, the following text is therefore output via the loudspeaker 8 or via the sensor screen 7: "turn left: travel duration 15 minutes; turn right: travel duration 5 minutes; when turning left, pass the cathedral of A on the way to Z".

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for guiding a driver of a vehicle along a travel route (10), comprising:
    determining the travel route (10) and a corresponding recommended route outputtable to the driver;
    identifying a road sign (13, 15, 16) arranged along the determined travel route (10) as an identified road sign if both of the following criteria (a) and (b) are met:
      (a) that the road sign displays directions indicating an alternative route, wherein the alternative route indicated by the displayed directions of the road sign deviates from the recommended route, and
      (b) that the road sign is arranged at or before a fork in the road at which it is actually possible to follow the recommended route;
    outputting to the driver the recommended route on, or prior to, reaching the identified road sign (13, 15, 16); and
    outputting to the driver information relating to the deviation between the displayed directions of the identified road sign and the recommended route.

2. The method as claimed in claim 1, wherein the determination of the travel route (10) comprises optimization of one or more selected from among the group consisting of the following parameters that relate to the travel route (10): an expected travel duration, a route length, an expected energy consumption of the vehicle, a road toll to be paid, a maximum positive gradient, a maximum negative gradient, a maximum distance between refueling points and/or battery charging stations located along the travel route (10), a view of a natural or man-made site, and a minimum height of a flyover over a road being used when following the travel route (10).

3. The method as claimed in claim 2, wherein the information output to the driver contains an indication as to which of the parameters is/are changed when the vehicle follows the recommended route, and/or the information contains an indication as to which of the parameters is/are changed when the vehicle follows the alternative route indicated by the directions of the identified road sign.

4. The method as claimed in claim 1,
    wherein the directions of the identified road sign indicating the alternative route comprise one or more selected from the group consisting of:
    a) a name or a designation of a destination (12), wherein the destination (12) is an end point of the travel route (10),
    b) a name or a designation of a first locality (A), wherein a distance of the first locality (A) from the destination (12) is shorter than a predefined maximum distance,
    c) a name or a designation of a second locality (A), wherein the second locality (A) is located on the travel route (10),
    d) a name or a designation of a third locality (B), wherein the third locality (B) is located on a first route which is the fastest and/or shortest connection between a location of the identified road sign (13, 15, 16) and the destination (12), and
    e) a name or a designation of a fourth locality (C), wherein an initial section of a second route, which is the fastest and/or shortest connection between the location of the identified road sign (13, 15, 16) and the fourth locality (C), and an initial section of the first route coincide.

5. The method as claimed in claim 1,
wherein the identification of the identified road sign (13, 15, 16) comprises calling data, which relate to the one or more road signs (13, 14, 15, 16) arranged along the travel route (10), from a memory unit of a navigation device (1) arranged in the vehicle, and/or transmitting said data via a radio link to the navigation device (1), and/or acquiring said data during the travel of the vehicle by an optical image capturing unit arranged in the vehicle, and
wherein the data contain locations of the one or more road signs (13, 14, 15, 16) and directions displayed by the respective one or more road signs (13, 14, 15, 16).

6. The method as claimed in claim 1,
wherein the directions of the identified road sign indicating the alternative route comprise an indication of a first direction to be traveled in, or the directions of the identified road sign indicating the alternative route comprise a first designation of a first road to be followed, and the recommended route comprises an indication of a second direction to be traveled in, or the recommended route comprises a second designation of a second road to be followed, wherein the first direction is different from the second direction, and/or wherein the first designation is different from the second designation.

7. The method as claimed in claim 1,
wherein the determination of the travel route (10) comprises inputting a destination (12), wherein the destination (12) is an end point of the travel route (10), or determining a current location of the vehicle.

8. The method as claimed in claim 1, wherein the recommended route and/or the information are/is output to the driver if the vehicle undershoots a predefined distance from the identified road sign (13, 15, 16), or if an expected time period up to arrival at the identified road sign (13, 15, 16) is less than a predefined time period.

9. The method as claimed in claim 1, wherein the recommended route and/or the information are/is output to the driver graphically and/or acoustically.

10. A navigation device (1) for a motor vehicle, comprising:
a memory;
a computing unit that:
determines a travel route (10) and a corresponding recommended route outputtable to a driver of the motor vehicle, and
identifies a road sign (13, 15, 16) arranged along the determined travel route (10) as an identified road sign if both of the following criteria (a) and (b) are met:
(a) that the road sign displays directions indicating an alternative route, wherein the alternative routed indicated by displayed directions of the road sign deviates from the recommended route, and
(b) that the road sign is arranged at or before a fork in the road at which it is actually possible to follow the recommended route; and
an output unit that outputs to the driver the recommended route and outputs information relating to the deviation between the displayed directions of the identified road sign and the recommended route.

* * * * *